(12) United States Patent
Sihare

(10) Patent No.: US 8,195,854 B1
(45) Date of Patent: Jun. 5, 2012

(54) METHOD AND MECHANISM TO PROVIDE HIGH AVAILABILITY STORAGE SOLUTION BY LOAD BALANCING AND FAULT TOLERANCE SUPPORT IN THE STORAGE CONTROLLER CARDS AND HBAS

(75) Inventor: Ankit Sihare, Madhya Pradesh (IN)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/087,233

(22) Filed: Apr. 14, 2011

(51) Int. Cl.
*G06F 13/12* (2006.01)
*G06F 3/00* (2006.01)

(52) U.S. Cl. ......................................... 710/74; 719/324

(58) Field of Classification Search .................. 710/74
See application file for complete search history.

(56) References Cited

U.S. PATENT DOCUMENTS

| | | | |
|---|---|---|---|
| 7,480,742 B2 * | 1/2009 | Arndt et al. ........................ | 710/8 |
| 2005/0066060 A1 * | 3/2005 | Pinkerton et al. ............. | 709/249 |
| 2009/0271589 A1 | 10/2009 | Karpoff et al. | |

OTHER PUBLICATIONS http://www.broadcast-storage.net/docs/cuc_clipstorSAS_final.pdf; accessed Mar. 25, 2011.

* cited by examiner

*Primary Examiner* — Henry Tsai
*Assistant Examiner* — Juanito Borromeo
(74) *Attorney, Agent, or Firm* — Christopher P. Whitham; Cochran Freund & Young LLC

(57) ABSTRACT

Disclosed is a method and mechanism for virtualizing the resources of multiple physical storage controller cards/HBAs available to a host computer system into a single virtual controller. An Advanced Storage Driver (ASD) may be inserted in a layer above the base device drivers of the storage controllers/HBAs and act as a single virtual controller for access to the end target devices connected to the multiple physical storage controllers/HBAs so that at any point in time the resources of each of the controllers/HBAs may be dynamically allocated to the various requested operations. The ASD may have bi-directional communication with each controller/HBA firmware directly and/or with the base device driver associated with each controller/HBA in order to permit both direct and base device driver controlled communication with each of the physical controllers/HBAs. The ASD may further provide load sharing between the controllers/HBAs as well as fault tolerance functionality to reroute communications through a different controller/HBA in the event of a failure of one or more of the controllers/HBAs.

18 Claims, 3 Drawing Sheets

100 BLOCK DIAGRAM OF THE PHYSICAL & COMMUNICATION ARCHITECTURE FOR AN EMBODIMENT

METHOD AND MECHANISM TO PROVIDE HIGH AVAILABILITY STORAGE SOLUTION BY LOAD BALANCING AND FAULT TOLERANCE SUPPORT IN THE STORAGE CONTROLLER CARDS AND HBAS

BACKGROUND OF THE INVENTION

Computer systems have typically connected to remote target devices (i.e., remote storage devices/systems and other target devices) via storage controller cards and/or Host Bus Adapters (HBAs). The storage controller card and the HBA provide similar functionality in providing the hardware interface to the communication connection with target devices and the necessary communication control functionality to permit communication between a host computer system and the end target devices. Storage controller cards typically may further incorporate some additional storage control/management functionality for the target storage devices, such as providing RAID (Redundant Array of Independent Disks) functionality and/or other storage specific functionality in addition to the control/management of the communications between the host computer and the target storage devices. A typical computer system may run a device driver application as an interface between other software applications running on the host computer system and each physical storage controller card/HBA available to the host computer system.

SUMMARY OF THE INVENTION

An embodiment of the present invention may comprise a method of accessing end target devices connected to a host computer system via a switched storage network using multiple storage controllers/HBAs present on the host computer system by at least one host system software application running on the host computer system comprising: creating an Advanced Storage Driver (ASD) that operates on the host computer system and acts as a single virtual device driver for access to the end target devices by the at least one host system software application; encapsulating the multiple storage controllers/HBAs and multiple base device drivers running on the host computer system associated on a one-to-one basis with the multiple storage controllers/HBAs as resources of the Advanced Storage Driver in order to virtualize the multiple storage controllers/HBAs for access by the at least one host system software application through the Advanced Storage Driver; communicating between the Advanced Storage Driver and the at least one host system software application input and output communications that are from and intended to be delivered to the end target devices; communicating by the Advanced Storage Driver with the multiple base device drivers associated with the multiple storage controllers/HBAs an indication of storage controller/HBA availability/utilization for each storage controller/HBA of the multiple storage controllers/HBAs associated with each base device driver of the multiple base device drivers; storing by the Advanced Storage Driver the indication of storage controller/HBA availability/utilization for each storage controller/HBA of the multiple storage controllers/HBAs in at least one resource table of the Advanced Storage Driver; mapping by the Advanced Storage Driver the input and output communications for the end target devices across the multiple storage controllers/HBAs based on the storage controller/HBA availability/utilization stored in the at least one resource table; and communicating by the Advanced Storage Driver the input and output communications for the end target devices directly to the multiple storage controllers/HBAs in accord with the mapping of the input and output communications determined by the Advanced Storage Driver such that the multiple storage controllers/HBAs perform the mapped communications from/to the end target devices.

An embodiment of the present invention may further comprise an advanced storage host computer system that accesses end target devices connected to the advanced storage host computer system via a switched storage network using multiple storage controllers/HBAs present on the advanced storage host computer system by at least one host system software application running on the advanced storage host computer system comprising: an Advanced Storage Driver (ASD) that acts as a single virtual device driver for access to the end target devices by the at least one host system software application and encapsulates the multiple storage controllers/HBAs and multiple base device drivers running on the advanced storage host computer system associated on a one-to-one basis with the multiple storage controllers/HBAs as resources of the Advanced Storage Driver in order to virtualize the multiple storage controllers/HBAs for access by the at least one host system software application through the Advanced Storage Driver; an ASD to host software applications subsystem that communicates between the Advanced Storage Driver and the at least one host system software application input and output communications that are from and intended to be delivered to the end target devices; an ASD to base device driver communication subsystem that communicates from the Advanced Storage Driver with the multiple base device drivers associated with the multiple storage controllers/HBAs an indication of storage controller/HBA availability/utilization for each storage controller/HBA of the multiple storage controllers/HBAs associated with each base device driver of the multiple base device drivers; a resource table subsystem that stores the indication of storage controller/HBA availability/utilization for each storage controller/HBA of the multiple storage controllers/HBAs in at least one resource table of the Advanced Storage Driver; a resource mapping subsystem that maps the input and output communications for the end target devices across the multiple storage controllers/HBAs based on the storage controller/HBA availability/utilization stored in the at least one resource table; and an ASD to storage controller/HBA communication subsystem that communicates to/from the Advanced Storage Driver the input and output communications for the end target devices directly to the multiple storage controllers/HBAs in accord with the mapping of the input and output communications determined by the Advanced Storage Driver such that the multiple storage controllers/HBAs perform the mapped communications from/to the end target devices.

DETAILED DESCRIPTION OF THE EMBODIMENTS

Virtualization and/or cluster environments, such as cloud computing, may virtually distribute hardware resources (aka. target devices), including physical storage resources such as disk drives, among different host computer systems. In a cloud computing type of virtualization environment, the highly available storage system resources may result in overloading of the physical Host Bus Adapters (HBAs) and/or storage controller cards (aka. storage controllers or just controllers) used to connect and communicate with the end target devices/end hardware resources. For virtualization and/or cluster environments, it may be desirable to have as little downtime as possible for the physical controllers/HBAs and/or for the end target devices/end hardware resources accessed via the physical controllers/HBAs. Accordingly, it may be desirable to implement a method or mechanism to share the resources of the physical storage controllers/HBAs so that the hardware resources of the physical controllers/HBAs may be shared for accessing the end target devices/end hardware resources. In particular, a controller/HBA sharing entity may manage load balancing between various storage controllers/HBAs and/or manage fault tolerance situations (e.g., handle/reroute communications for hardware faults and/or fatal errors of one or more of the storage controllers/HBAs). A method, such as multi-pathing, may provide fault tolerance support at the link level, but not adequately address load sharing. An embodiment may provide a new controller stack (i.e., a new driver level) at the host computer system of the physical controllers/HBAs that may provide for fault tolerance as well as load balancing at the controller/HBA level.

Figure 1:
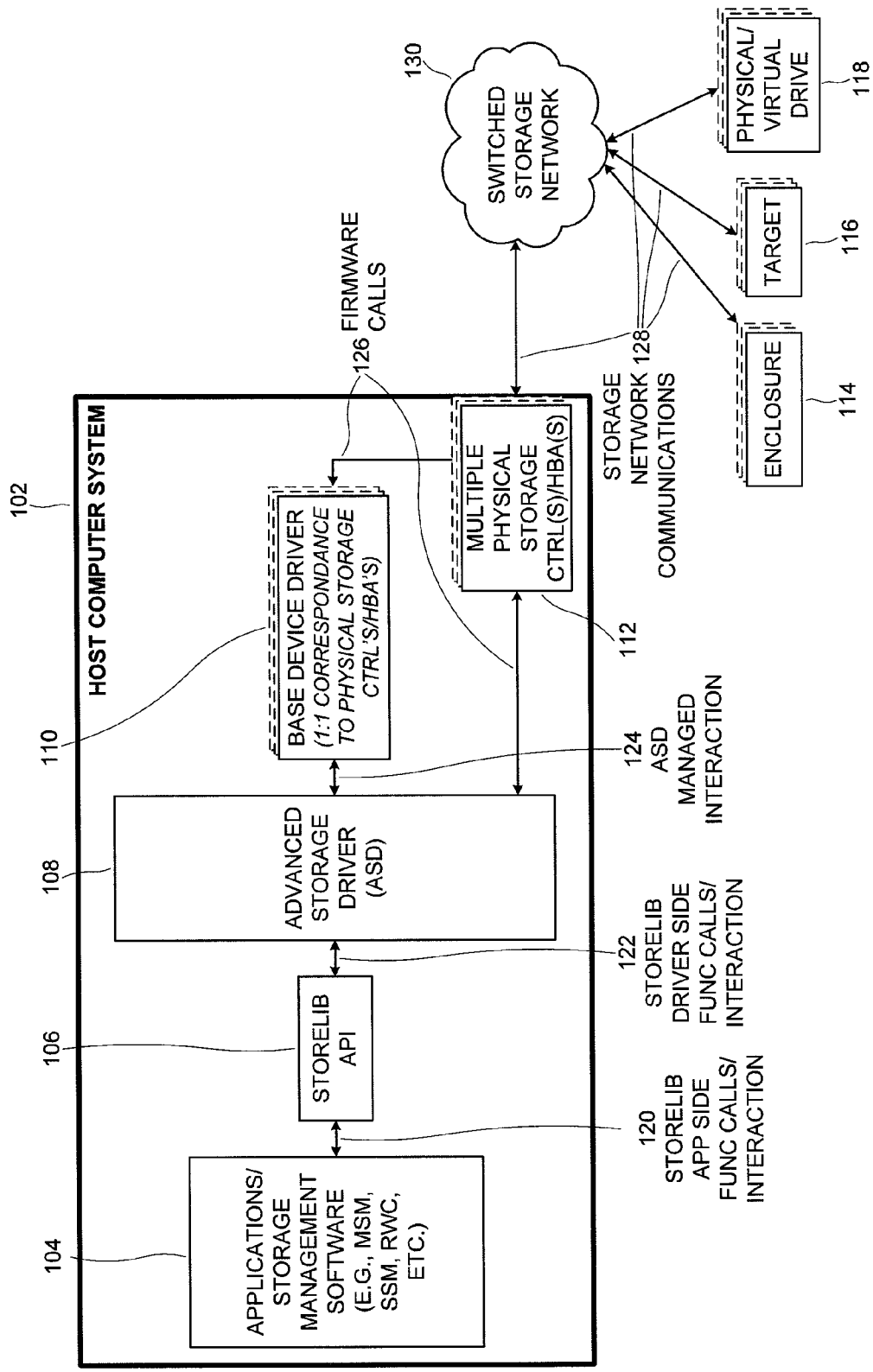
FIG. 1 is a block diagram of the physical and communication architecture for an embodiment.

FIG. 1 is a block diagram 100 of the physical and communication architecture for an embodiment. An embodiment may introduce an additional driver stack 108, the Advanced Storage Driver (ASD) into the storage controller driver architecture 108, 110 of a computer system 102. The additional driver stack (aka. ASD) 108 may then be used by an embodiment to virtualize the hardware storage controller/HBA 112 and base software device driver 110 resources of a plurality of storage controllers/HBAs 112 such that the resources 110, 112 for each of the multiple storage controllers/HBAs 112 may be dynamically allocated to whatever operation is assigned by the ASD 108. Further, the ASD 108 may act as a single "virtual" device driver 108 that constitutes the hardware 112 and software 110 resources of the multiple controllers/HBAs present within the computer system 102. Thus, various applications (e.g., storage management software) wishing to interact with, manage, and/or control the end target devices 114-118 connected to the computer system 102 via the physical storage controllers/HBAs 110 may simply interact with the ASD 108 instead of the multiple base device drivers 110 associated with the multiple controllers/HBAs 112. Accordingly, the ASD driver stack 108 may provide a "wrapper" to the base device drivers 110 of each of the controller/HBA cards 112 to present the multiple controller resources 110, 112 to applications 104 as a single logical controller 108. Thus, the ASD 108 virtualizing the multiple controller/HBA cards 112 may share the resources 110, 112 of the multiple controllers/HBAs 112 to balance the communication and control operational load being performed by each of the resources 110, 112 of the multiple controllers/HBAs 112. Thus, for heavy I/O (Input/Output) operations, the shared resources 110, 112 of the ASD 108 may be optimized to split the operations among the multiple controllers/HBAs 112 as opposed to a traditional operation that may attempt to perform the heavy I/O using the single storage controller/HBA 112 assigned to the particular end target devices 114-118 being accessed. Similarly, if a fatal error and/or other failure condition is encountered for one or more of the multiple physical storage controllers/HBAs 112 or an associated base device driver 110 of the storage controllers/HBAs 112, the ASD 108 may reroute communications associated with the failed storage controllers/HBAs 112 and/or associated base device drivers 110 to other storage controllers/HBAs 112 in order to provide fault tolerance.

The computer system 102, which, herein, may also be referred to as the ASD 108 host computer system 102, may be a general purpose computer system defined to operate in a specific manner in accord with the systems, sub-systems, drivers, controllers, HBAs, etc. of an embodiment disclosed herein. Further, a specific purpose computer using firmware and/or other specific purpose hardware may also be used to provide the functionality disclosed herein. Further, a general purpose computer may be a classical personal computer/laptop computer, but may also be any other type of electronic computing platform capable of performing the necessary computations and capable of including/accessing multiple storage controllers/HBAs within/from the electronic computing platform. Accordingly, the electronic computing platform may include, but is not limited to: a general purpose computer, a specific purpose computer, a handheld electronic device, etc.

An embodiment of the Advance Storage Driver (ASD) stack 108 may communicate bi-directionally with applications 104 running on the computer system 102 through a storage controller/HBA device driver Application Programming Interface (API) 106, such as the "StoreLib" API 106 provided by LSI Corporation. As used herein, "StoreLib" is not meant to restrict the API interface to a particular interface (e.g., not restricted to the StoreLib provided by LSI Corporation), but "StoreLib is meant to refer to a general API interface for programs/software applications 104 (e.g., storage management software 104) that may be created in a high level programming language so that programmers of the programs/software applications may easily interface with a device driver, such as the base device drivers 110, using common functions having the same name and programmatic structure for each potential base device driver 110 that may be accessed by the programs/software applications 104. While an embodiment of the ASD may support interfacing/communicating with programs/software applications 104 via the a general/particular StoreLib API 106, various embodiments also permit customized access to the ASD 108 via a custom programmed interface in addition to and/or in replacement of the StoreLib API 106. The programs/software applications 104 may include any program/software 104 capable of being run on the computer system 102 having the necessary communications capability to communicate with the ASD 108, such as support for the StoreLib API 106 that may be supported by various embodiments of the ASD 108. The programs/software 104 may include programs/applications that primarily run on a different computer system, but use a network connection to the ASD 108 host computer system 102 to connect with the ASD 108 and the multiple controller/HBA resources 110, 112 available on the ASD 108 host computer system 102. For programs/applications 104 that partly, or even primarily, run on a different computer system than the ASD 108 host computer system 102, a small program/software application 104 may be provided on the ASD 108 host computer system 102 to facilitate communication (such as by providing access to the StoreLib API 106 on the ASD 108 host computer system 12) between the ASD 108 and the remote program/software application 104. Potential programs/software applications 104 include, but are not limited to: storage management software, MSM (MegaRAID Storage Management) software, SSM (Storage System Manager) software, RWC (RAID Web Console) software, etc. In the embodiment shown in FIG. 1, the ASD 108 communicates with the applications/storage management software 104 running on the host computer system 102 via the StoreLib API 108. Thus, the applications/storage management software 104 invokes StoreLib application side function/interaction calls 120 of the StoreLib API 120 to communicate with the ASD 108 and the ASD 108 invokes StoreLib driver side function/interaction calls 122 to communicate with the applications/storage management software 104.

An embodiment of the ASD stack 108 may further communicate bi-directionally with each of the base device drivers 110 and/or bi-directionally with the firmware running on each of the multiple storage controller cards/HBAs 112. Typically, there is a based device driver 110 for each physical storage controller/HBA 112 (i.e., a 1:1 correspondence). Each base device driver 110 may also be capable of bi-directional communication via firmware calls 126 with the single storage controller/HBA 112 associated with each base device driver 110, so there are potentially two paths for the ASD 108 to communicate with each physical controller/HBA 112. The ASD 108 may communicate directly with the physical controller/HBA 112 via firmware calls 126 to the physical controller/HBA 112, or the ASD 108 may manage interaction 124 with the base device driver 110 associated with the physical controller/HBA 112 being accessed and cause the associated base device driver 110 to communicate the necessary firmware calls 126 with the physical controller/HBA 112 being used. As such, an embodiment of the ASD stack 108 may be said to sit "on top" of the traditional base device drivers 110 associated with each of the multiple physical storage controllers/HBAs 112 while at the same time having direct communication with the multiple physical storage controllers/HBAs 112, ensuring that necessary firmware calls 126 to the physical storage controllers/HBAs 112 are properly handled without having to rely on the base device drivers 110 to perform the desired firmware calls 126. As described above, an embodiment of the ASD stack 108 may also handle the interaction with the StoreLib API 106, and, hence, the interaction with the upper level applications/storage management software 104. Accordingly, an embodiment of the ASD stack may encapsulate the software (i.e., base device drivers) 110 and hardware resources (i.e., the controller/HBA cards) with respect to the applications/storage management software 104 such that the applications/storage management software 104 view the ASD 108 as a single "virtual" storage controller/HBA. As described further below, an embodiment of the ASD 108 encapsulating the software 110 and hardware 112 resources of the physical controllers/HBAs 112, may take responsibility for the virtualization of the software 110 and hardware 112 resources of the physical controllers/HBAs 112 and may also perform intelligent switching operations of application/storage management software 104 requested I/O operations among the available controllers/HBAs 112. Various embodiments may permit a user to add and remove physical storage controllers/HBAs 112 that are available to the host computer system 102 such that so that a user may determine if all, or only a subset, of the available physical storage controllers/HBAs 112 of the host computer system 102 are encapsulated and managed by the ASD 108. Also, if desired, multiple instances of an embodiment of the ASD 108 may run concurrently with each instance of the ASD encapsulating and managing a different subset of the resources 110, 112 of the available physical storage controllers/HBAs 112.

Each physical storage controller/HBA 112 may be assigned as the controller/communication manager for one or more end target devices 114-118. The end target devices 114-118 may be any of a wide variety of devices designed to communicate with the storage controller/HBA 112 associated with the end target device 114-118. End target devices 114-118 may include an enclosure 114 housing multiple devices, such as a RAID (Redundant Array of Independent Disks) enclosure 114 that has RAID functionality built into a self-contained enclosure 114 of the multiple computer readable storage devices (e.g., hard disk drives and/or solid state drives) making up the RAID. The end target devices 114-118 may also include individual computer readable storage drives 118 (e.g., an individual disk or solid state drive). The end target device computer readable storage drive(s) 118 may be either an actual physical computer readable storage drive 118 or a virtual (i.e., logical) representation of a computer readable storage drive 118. Other end target devices 116 designed to work with the storage network communications 128 protocol of the storage controllers/HBAs 112 may also be accessed and managed by an embodiment of the ASD 108. Some of the other potential end target devices 116 may include, but are not limited to: scanners, printers, fax machines, optical drives, etc. The multiple physical storage controllers 112 may be connected to the end target devices 114-118 via one or more storage network communications protocols 128. Some of the potential storage network communications protocols 128 may include, but are not limited to: SAS, SCSI, Ethernet, Fibre Channel, FireWire (i.e., IEEE 1394), eSATA (external Serial ATA (Advanced Technology Attachment)), iSCSI (Internet SCSI), USB (Universal Serial Bus), etc.

To permit sharing of the communication paths to the end target devices 114-118, the end target devices may be connected via a switched storage network 130 such that each physical storage controller/HBA 112 has a possible physical communication path to each end target device 114-118. In some embodiments, the switched storage network 130 may include the necessary communication gateways between different communication protocols 128 such that it is possible for a physical storage controller/HBA 112 for one storage network communication protocol 128 (e.g., eSATA) to communicate with an end target device 114-118 communicating on a different storage network communication protocol 128 (e.g., SAS).

Also, as one skilled in the art will recognize, one method to implement a "virtual" computer readable storage drive 118 may be for a SAS (Serial Attached SCSI (Small Computer System Interface) implementing SAS zoning to provide "virtual" access to a computer readable drive as a "logical" (i.e., "virtual") representation 118 of a physical drive connected and/or zoned-in with a controller on a different computer system that is attached to the subject host computer system 102 via the switched storage network 130. The subject host computer system 102 may then access the "virtual" drive 118 presented by the other computer system/controller by communicating with the other computer system/controller as if the other computer system/controller were the virtual computer readable storage device 118 and the actual communication with the physical computer readable storage device is performed by the other computer system/controller presenting the "virtual" computer readable storage device.

An embodiment of the ASD 108 may further provide for intelligent switching between the various software 110 and hardware 112 resources associated with the multiple physical controllers/HBAs 112. For instance, an embodiment may provide load sharing capabilities to share the communications I/O between two or more of the physical controllers/HBAs 112 based on the resource availability of each of the physical controllers/HBAs 112 for a particularly large I/O request that would have traditionally been handled by a single physical controller/HBA 112. In order to track the available resources 112, an embodiment of the ASD stack 108 may maintain a resource table that holds the availability of each of the multiple controller/HBA cards 112 connected to the ASD stack 108. Various embodiments may implement the resource table as a single resource table for each resource (i.e., for each controller/HBA 112). Other embodiments may maintain the data for each of the available controllers/HBAs 112 in a single resource table, so long as the resource availability for each resource 112 is maintained and available to the ASD stack 108 for evaluation when optimizing load sharing between the resources (i.e., controllers/HBAs 112). An embodiment of the ASD stack 108 may then utilize the contents of the resource table(s) to perform resource mapping of which resources (i.e., which physical controllers/HBAs 112) are available and to what extent each resource 112 is available such that the ASD stack 108 may optimize the resource 112 use so that each resource 112 is used equally, or so that each resource is used at a desired utilization rate. The ability to load share between the multiple physical controllers/HBAs 112 may permit the entire host computer system 102 to operate more efficiently and with higher degree of controller 112 availability, which is desirable for most computer applications, including cloud and/or cluster computing environments that are common data-center implementations. One skilled in the art will recognize that various schemes may be employed to share the resources 112 and to optimize resource 112 use to a level desired by a system programmer. For some embodiments equal resource 112 use may be desirable, but for other embodiments it may be desirable to utilize one resource 112 (i.e., controller card 112) first because a particular controller card 112 may have better performance than other controller cards. Thus, the specific optimization scheme is dependent on the controller cards/HBAs 112 available and the ultimate goals of the system designer in load sharing between the controller cards/HBAs 112. The encapsulation/wrapping of the multiple physical controllers An embodiment may have the base device driver 110 associated with a physical controller/HBA 112 read/monitor/maintain the resource 112 availability/utilization of the physical controller/HBA 112 associated with the base device driver 110. Each base device driver may then pass the resource 112 availability/utilization information to the ASD stack 108 so that the ASD stack 108 is aware of the resource 112 availability/utilization of each physical controller/HBA 112 encapsulated by the ASD 108. The resource availability/utilization information may be updated in real-time as often as necessary to maintain the resource table(s) used by the ASD stack 108 to perform resource mapping for load sharing (and fault tolerance as discussed below).

While an embodiment may have the ASD stack 108 act as a single "virtual" controller/device driver, it may also be desirable for the applications/storage management software 104 to know about the actual physical storage controllers/HBAs 112 available to the host computer system 102. Therefore, an embodiment of the ASD stack 108 may pass information about each physical controller/HBA card 112 present so that the application/storage management software 104 may be aware of the physical architecture of the controllers/HBAs 112. Consequently, the controller/stack information is transparent trough the ASD stack 108 such that the application/storage management software 104 is able to that the ASD stack is made up of the multiple physical storage controller/HBA cards 112.

An embodiment may provide fault tolerance using the same types of mechanisms as used for the load sharing implementation of an embodiment disclosed above. For instance, a fault may be reported as zero (0) availability of a resource (i.e., of a physical controller/HBA card 112). For some embodiments, some lower threshold limit that is above zero (0) availability may be set to indicate over utilization of a storage controller/HBA resource 112 and trigger a fault tolerance shifting of communications to other storage controllers/HBAs. An embodiment of the ASD stack 108 may observe that a resource 112 has zero (0) availability (or near zero availability) and channel operations and/or I/O using the next available controller/HBA 112. Another embodiment may share the load from the faulty (i.e., zero availability) resource 112 with multiple other physical storage controllers/HBAs 112 for the same type of "load sharing" reasons as disclosed above with respect to load sharing between the physical controller/HBA resources 112. By using the availability as a measurement of fault, a system may adjust for actual faults and fatal errors of a particular controller/HBA card 112 as well as simple over-utilization of a controller/HBA card 112 that results in zero (0) availability of the controller/HBA card 112. Various embodiments may also respond to actual notices of fatal errors and faults in the same manner as done by the response to zero (0) resource 112 availability as discussed above. Once the faulty controller/HBA 112 returns to normal service (i.e., no longer has zero availability and/or has a report that the fault/fatal error has been cleared), the resource table(s) may be updated accordingly and the ASD stack 108 may utilize the formerly faulty controller/HBA 112 in a similar fashion to operation prior to the fault occurrence.

Accordingly, an embodiment that implements an ASD stack 108 and provides load sharing and/or fault tolerance for the physical storage controllers/HBAs 112, may provide a variety of desirable results for a computer system 102 implementation. The various embodiments may provide a hardware independent solution as an embodiment of the ASD stack 108 is independent of the physical controllers/HBAs present on the host computer system 102. Thus, the various embodiments may provide high resource 112 availability at a low cost of implementation. Further, as the various embodiments may provide load sharing capabilities, the various embodiments may provide better power efficiency by not over loading high power resources such that the various embodiments may better meet the needs of the cluster and/or virtualization environments common for current data-center implementations. Further, eliminating bottlenecks from one resource (i.e., one physical storage controller/HBA 112) and more fully utilizing underutilized resources 112 further helps make the overall host computer system 102 more efficient and may eliminate the need to unnecessarily add additional resources (i.e., controller/HBA cards 112). Hence, the various embodiments may also lower the total cost of ownership of the host computer system 102. The implementation of the ASD stack 108 in the various embodiments is also scalable because the ASD stack 108 of an embodiment may encapsulate/wrap around a few or many of the physical storage controllers/HBAs 112 and associated based device drivers 110. Consequently, the various embodiments provide a net benefit of storage and resource optimization.

Figure 2:
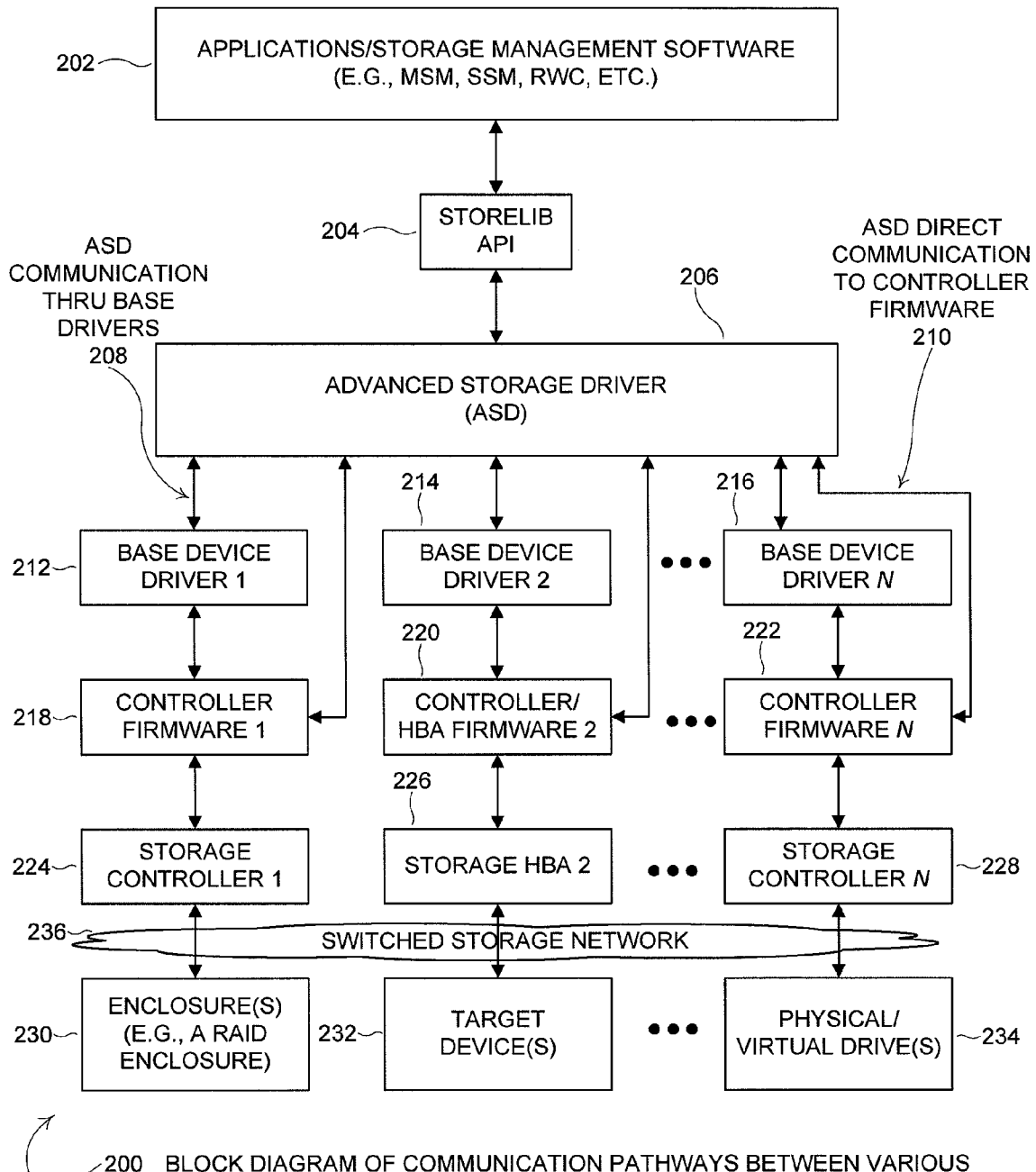
FIG. 2 is a block diagram of the communication pathways between various elements of an embodiment.

FIG. 2 is a block diagram 200 of the communication pathways between various elements of an embodiment. In the embodiment shown in FIG. 2, the applications/storage management software (e.g., MSM, SSM, RWC, etc.) 202 communicates with the Advanced Storage Driver (ASD) 206 via the StoreLib API 204. As described above, the StoreLib API 204 may be a function library for upper level programs to communicate with device drivers such as base device drivers 1 to N (212-216). The ASD may also bi-directionally communicate with either or both of the base device drivers 1 to N (212-216) or directly with the firmware 1 to N (218-222) of the storage controller 1 (230) and HBA 2 (232) to storage controller N (228) associated with base device drivers 1 to N (212-216). Thus, the ASD 206 sits in a layer atop the base device drivers 212-216 and the physical storage controllers/HBAs 224-226 and the firmware 218-222 associated with the physical storage controllers/HBAs 224-226. The storage controllers/HBAs 224-228 may communicate with target devices 230-234 assigned to each of the storage controllers/HBAs 224-228. The communication path from the storage controllers/HBAs 224-228 may be through a switched storage network 236 that might permit the storage controllers/HBAs 224-228 to communicate to target devices 230-234 that are not assigned to a particular storage controller/HBA 224-228 and not supported by the base device driver 212-216 associated with a particular storage controller/HBA 224-228.

In the embodiment shown in FIG. 2, base device driver 1 (212) communicates with controller firmware 1 (218) that is part of storage controller 1 (224), which controls and manages the enclosure(s) (e.g., RAID enclosure(s)) 230 acting as the end target device for the base device driver 1 (212), controller firmware 1 (218), storage controller 1 (224) communication path. The base device driver 1 (212) likely does not have knowledge of, or the capability to interact with other types of end target devices such as devices 232 and 234. Similarly, base device driver 2 (214) communicates with controller/HBA firmware 2 (220) that is part of storage HBA 2 (226), which controls and manages the target device(s) (e.g., computer readable media devices, scanners, printers, etc.) 232 acting as the end target device for the base device driver 2 (214), controller/HBA firmware 2 (220), storage HBA 2 (226) communication path. The base device driver 2 (214) likely does not have knowledge of, or the capability to interact with other types of end target devices such as devices 230 and 234. Also, base device driver N 216 communicates with controller/HBA firmware N 222 that is part of storage controller N 228, which controls and manages the physical/virtual computer readable media drive(s) (e.g., hard disk drives, solid state drives, and virtual/logical access points for computer readable media drives) 234 acting as the end target device for the base device driver N 216, controller firmware N 222, storage controller N 228 communication path. The base device driver N 216 likely does not have knowledge of, or the capability to interact with other types of end target devices such as devices 230 and 232. The ASD 206 sitting in a layer above the base device drivers 212-216 and encapsulating the base device drivers 212-216 and associated controller firmware 218-222 may communicate 208 to the end devices 230-234 through the base device drivers 212-216 or may directly communicate 210 with the controller/HBA firmware 218-222. By having knowledge of each of the storage controllers/HBAs 224-228, the ASD may send firmware calls 210 to the controller/HBA firmware 218-222 to permit the storage controllers 224-228 to communicate through the switched storage network 236 with target devices 230-234 that may not be supported by the base device driver 212-216 associated with the subject storage controller 224-228. For instance, base device driver 1 (212) may not support interaction with target device(s) 232, but by directly communicating 210 with controller firmware 1 (218), the ASD may be able to communicate with target device(s) 232 via the switched storage network 236 so as to permit load sharing with the other storage controllers/HBAs 226, 228 and/or to permit uninterrupted communication with the target device(s) 232 even when storage HBA 2 (226) has encountered a fatal error or is otherwise unavailable.

Figure 3:
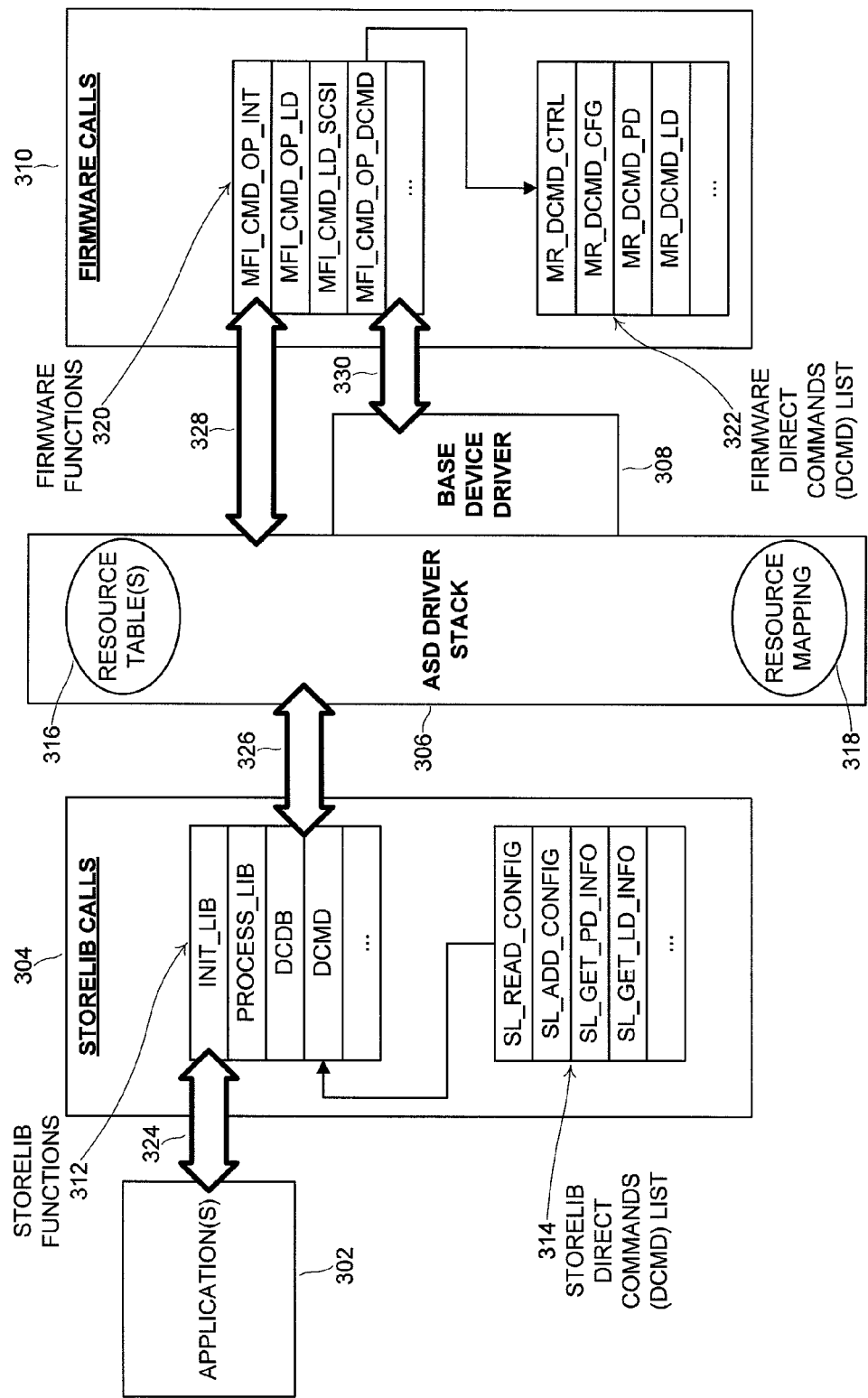
FIG. 3 is a block diagram of the software function calls and storage resource operations for an embodiment.

FIG. 3 is a block diagram 300 of the software function calls and storage resource operations for an embodiment. In the embodiment shown in FIG. 3, an application (or applications) 302 may bi-directionally interact 324 with the StoreLib using StoreLib function calls 304. As shown in FIG. 3, some, but not all, StoreLib functions 312 include an initialize function (Init_Lib), a process function (Process_Lib), a Direct Command Description Block (DCDB), and a Direct Command (DCMD) function. Further, the potential Direct Commands may be selected from a list 314 of supported direct commands. The ASD driver stack 306 may communicate 326 with the application(s) 302 via the same, or similar, StoreLib function calls 304. The ASD driver stack 306 may sit as a layer on top of the base device driver 308 and may communicate directly with the base device driver 308. The base device driver 308 may communicate 330 with the firmware using firmware calls 310 acting either independently, or at the direction of the ASD driver stack 306. Additionally, the ASD driver stack 306 may also communicate directly 328 with the firmware via firmware calls 310 independent of the base device driver 308. As shown in FIG. 3, some, but not all, firmware functions 320 include a command operation initialize function (MFI_CMD_OP_INT), a command operation for a Logical Drive (MFI_CMD_OP_LD), a command operation for a logical drive over a SCSI interface (MFI_CMD_LD SCSI), and a command operation for a Direct Command (MFI_CMD_OP_DCMD). Further, the potential Direct Commands may be selected from a list 322 of supported direct commands. One skilled in the art will recognize that the StoreLib functions 312 and direct commands 314 as well as the firmware functions 320 and firmware direct commands 322 may be comprised of additional and/or different functions and direct commands than those shown in FIG. 3. The functions 312, 320 and direct commands 314, 322 shown in FIG. 3 are simply examples provided to more clearly communicate the functions/direct command general architecture for an embodiment.

As seen in FIG. 3, the ASD driver stack 306 may further include one more resource tables 316 that identify and track the availability/utilization for the firmware/hardware of each physical storage controller/HBA. The ASD driver stack 306 also may include a resource mapping module/sub-system that utilizes the resource table(s) 316 to map control and communication I/O for end target devices to be sent through multiple storage controllers/HBAs for load sharing and through one or more other storage controllers/HBAs for I/O intended to be sent through a storage controller that is unavailable or has been determined to have a fatal error or fault.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of accessing end target devices connected to a host computer system via a switched storage network using multiple storage controllers/HBAs present on said host computer system by at least one host system software application running on said host computer system comprising:
   creating an Advanced Storage Driver (ASD) that operates on said host computer system and acts as a single virtual device driver for access to said end target devices by said at least one host system software application;
   encapsulating said multiple storage controllers/HBAs and multiple base device drivers running on said host computer system associated on a one-to-one basis with said multiple storage controllers/HBAs as resources of said Advanced Storage Driver in order to virtualize said multiple storage controllers/HBAs for access by said at least one host system software application through said Advanced Storage Driver;
   communicating between said Advanced Storage Driver and said at least one host system software application input and output communications that are from and intended to be delivered to said end target devices;
   communicating by said Advanced Storage Driver with said multiple base device drivers associated with said multiple storage controllers/HBAs an indication of storage controller/HBA availability/utilization for each storage controller/HBA of said multiple storage controllers/HBAs associated with each base device driver of said multiple base device drivers;
   storing by said Advanced Storage Driver said indication of storage controller/HBA availability/utilization for each storage controller/HBA of said multiple storage controllers/HBAs in at least one resource table of said Advanced Storage Driver;
   mapping by said Advanced Storage Driver said input and output communications for said end target devices across said multiple storage controllers/HBAs based on said storage controller/HBA availability/utilization stored in said at least one resource table; and
   communicating by said Advanced Storage Driver said input and output communications for said end target devices directly to said multiple storage controllers/HBAs in accord with said mapping of said input and output communications determined by said Advanced Storage Driver such that said multiple storage controllers/HBAs perform said mapped communications from/to said end target devices.

2. The method of claim 1 wherein particular end target devices are associated with particular storage controllers/HBAs of said multiple storage controllers/HBAs such that said base device drivers associated with said particular storage controllers/HBAs may only communicate with said particular target devices associated with said particular storage controllers/HBAs and wherein said Advanced Storage Driver communicating directly with said multiple storage controllers/HBAs may communicate with each end target device of said multiple target devices using each storage controller/HBA of said multiple storage controllers/HBAs regardless of said association of particular end target devices and said particular storage controllers/HBAs.

3. The method of claim 2 further comprising communicating by said Advanced Storage Driver said input and output communications for said particular end target devices to said base device drivers of said particular storage controllers/HBAs associated with said particular target devices such that said input and output communications for said particular end target devices are managed/controlled by said base device drivers associated with said particular storage controllers/HBAs associated with said particular end target devices.

4. The method of claim 1 wherein said communications between said Advanced Storage Driver and said at least one host system software application is accomplished using a storage library Application Programming Interface (API).

5. The method of claim 1 wherein said step of mapping said input and output communications for said end target devices across said multiple storage controllers/HBAs based on said storage controller/HBA availability/utilization stored in said at least one resource table further performs an intelligent load sharing analysis to optimize resource loading of said multiple storage controllers/HBAs.

6. The method of claim 1 further comprising detecting that a storage controller/HBA is in a fault condition and wherein said step of mapping said input and output communications for said end target devices across said multiple storage controllers/HBAs based on said storage controller/HBA availability/utilization stored in said at least one resource table further assigns input and output communications intended for said storage controller/HBA determined to be in said fault condition to at least one other storage controller/HBA of said multiple storage controllers/HBAs.

7. The method of claim 6 further comprising detecting that said storage controller determined to be in said fault condition has returned to normal operation from said fault condition and wherein said step of mapping said input and output communications for said end target devices across said multiple storage controllers/HBAs based on said storage controller/HBA availability/utilization stored in said at least one resource table further re-assigns input and output communications intended for said storage controller/HBA determined to be in said fault condition back to said storage controller now determined to have returned to normal operation from said fault condition.

8. The method of claim 6 wherein said fault condition is at least one of the fault conditions of the group consisting of: a zero availability of a storage controller/HBA, a substantially near zero availability of a storage controller/HBA, an availability of a storage controller/HBA below a user configured availability limit, a reported fault of a storage controller/HBA, and a reported fatal error of a storage controller/HBA.

9. The method of claim 1 further comprising communicating by said Advanced Storage Driver a physical architecture of said multiple storage controllers/HBAs to said at least one host system software application.

10. An advanced storage host computer system that accesses end target devices connected to said advanced storage host computer system via a switched storage network using multiple storage controllers/HBAs present on said advanced storage host computer system by at least one host system software application running on said advanced storage host computer system comprising:
- an Advanced Storage Driver (ASD) that acts as a single virtual device driver for access to said end target devices by said at least one host system software application and encapsulates said multiple storage controllers/HBAs and multiple base device drivers running on said advanced storage host computer system associated on a one-to-one basis with said multiple storage controllers/HBAs as resources of said Advanced Storage Driver in order to virtualize said multiple storage controllers/HBAs for access by said at least one host system software application through said Advanced Storage Driver;
- an ASD to host software applications subsystem that communicates between said Advanced Storage Driver and said at least one host system software application input and output communications that are from and intended to be delivered to said end target devices;
- an ASD to base device driver communication subsystem that communicates from said Advanced Storage Driver with said multiple base device drivers associated with said multiple storage controllers/HBAs an indication of storage controller/HBA availability/utilization for each storage controller/HBA of said multiple storage controllers/HBAs associated with each base device driver of said multiple base device drivers;
- a resource table subsystem that stores said indication of storage controller/HBA availability/utilization for each storage controller/HBA of said multiple storage controllers/HBAs in at least one resource table of said Advanced Storage Driver;
- a resource mapping subsystem that maps said input and output communications for said end target devices across said multiple storage controllers/HBAs based on said storage controller/HBA availability/utilization stored in said at least one resource table; and
- an ASD to storage controller/HBA communication subsystem that communicates to/from said Advanced Storage Driver said input and output communications for said end target devices directly to said multiple storage controllers/HBAs in accord with said mapping of said input and output communications determined by said Advanced Storage Driver such that said multiple storage controllers/HBAs perform said mapped communications from/to said end target devices.

11. The advanced storage host computer system of claim 10 wherein particular end target devices are associated with particular storage controllers/HBAs of said multiple storage controllers/HBAs such that said base device drivers associated with said particular storage controllers/HBAs may only communicate with said particular target devices associated with said particular storage controllers/HBAs and wherein said Advanced Storage Driver communicating directly with said multiple storage controllers/HBAs may communicate with each end target device of said multiple target devices using each storage controller/HBA of said multiple storage controllers/HBAs regardless of said association of particular end target devices and said particular storage controllers/HBAs.

12. The advanced storage host computer system of claim 11 wherein said ASD to base device driver communication subsystem further communicates said input and output communications for said particular end target devices from said Advanced Storage Driver to said base device drivers of said particular storage controllers/HBAs associated with said particular target devices such that said input and output communications for said particular end target devices are managed/controlled by said base device drivers associated with said particular storage controllers/HBAs associated with said particular end target devices.

13. The advanced storage host computer system of claim 10 wherein said communications between said Advanced Storage Driver and said at least one host system software application is accomplished using a storage library Application Programming Interface (API).

14. The advanced storage host computer system of claim 10 wherein said resource mapping subsystem further performs an intelligent load sharing analysis to optimize resource loading of said multiple storage controllers/HBAs.

15. The advanced storage host computer system of claim 10 further comprising a storage controller/HBA fault detection subsystem that detects that a storage controller/HBA is in a fault condition and wherein said resource mapping subsystem further assigns input and output communications intended for said storage controller/HBA determined to be in said fault condition to at least one other storage controller/HBA of said multiple storage controllers/HBAs.

16. The advanced storage host computer system of claim 15 wherein said storage controller/HBA fault detection subsystem further detects that said storage controller determined to be in said fault condition has returned to normal operation from said fault condition and wherein said resource mapping subsystem further re-assigns input and output communications intended for said storage controller/HBA determined to be in said fault condition back to said storage controller now determined to have returned to normal operation from said fault condition.

17. The advanced storage host computer system of claim 15 wherein said fault condition is at least one of the fault conditions of the group consisting of: a zero availability of a storage controller/HBA, a substantially near zero availability of a storage controller/HBA, an availability of a storage controller/HBA below a user configured availability limit, a reported fault of a storage controller/HBA, and a reported fatal error of a storage controller/HBA.

18. The advanced storage host computer system of claim 10 wherein said ASD to host software applications subsystem further communicates a physical architecture of said multiple storage controllers/HBAs to said at least one host system software application.

* * * * *